United States Patent
Takahashi et al.

(10) Patent No.: US 10,364,480 B2
(45) Date of Patent: Jul. 30, 2019

(54) METHOD FOR SMELTING NICKEL OXIDE ORE

(71) Applicant: SUMITOMO METAL MINING CO., LTD., Tokyo (JP)

(72) Inventors: Junichi Takahashi, Tokyo (JP); Taku Inoue, Tokyo (JP); Shuuji Okada, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 54 days.

(21) Appl. No.: 15/517,046

(22) PCT Filed: Sep. 15, 2015

(86) PCT No.: PCT/JP2015/076197
§ 371 (c)(1),
(2) Date: Apr. 5, 2017

(87) PCT Pub. No.: WO2016/056362
PCT Pub. Date: Apr. 14, 2016

(65) Prior Publication Data
US 2017/0306444 A1    Oct. 26, 2017

(30) Foreign Application Priority Data

Oct. 6, 2014  (JP) .................................. 2014-205828

(51) Int. Cl.
*C22B 23/02* (2006.01)
*C22B 23/00* (2006.01)
(Continued)

(52) U.S. Cl.
CPC .......... *C22B 23/023* (2013.01); *C21B 13/006* (2013.01); *C21B 13/0053* (2013.01);
(Continued)

(58) Field of Classification Search
CPC ... C21B 13/006; C21B 13/10; C21B 13/0053; C22B 1/2406; C22B 23/023;
(Continued)

(56) References Cited

U.S. PATENT DOCUMENTS

| | | | | |
|---|---|---|---|---|
| 3,746,533 A | * | 7/1973 | Moussoulous | ........ C21B 13/006 420/95 |
| 5,178,666 A | | 1/1993 | Diaz et al. | |

(Continued)

FOREIGN PATENT DOCUMENTS

| | | |
|---|---|---|
| CA | 1332286 C | 10/1994 |
| CN | 1262332 A | 8/2000 |

(Continued)

OTHER PUBLICATIONS

International Search Report dated Dec. 15, 2015, issued for PCT/JP2015/076197.

(Continued)

*Primary Examiner* — Tima M. McGuthry-Banks
(74) *Attorney, Agent, or Firm* — Locke Lord LLP

(57) ABSTRACT

A smelting method capable of obtaining an iron-nickel alloy having a high nickel grade of 4% or higher by effectively facilitating a reduction reaction of pellets formed using a nickel oxide ore as a raw material. The present invention is a method for smelting a nickel oxide ore, by which an iron-nickel alloy is obtained by forming pellets from a nickel oxide ore and reducing and heating the pellets. In the pellet production step S1, a mixture is obtained by mixing raw materials that contain at least a nickel oxide ore and a carbonaceous reducing agent. In the reduction step S2, a furnace floor carbonaceous reducing agent is laid on the floor of the smelting furnace in advance when placing the (Continued)

obtained pellets in the smelting furnace and the pellets are placed on the furnace floor carbonaceous reducing agent and then reduced and heated.

5 Claims, 4 Drawing Sheets

(51) Int. Cl.
| | | |
|---|---|---|
| C22B 1/24 | (2006.01) | |
| C21B 13/10 | (2006.01) | |
| C22B 5/10 | (2006.01) | |
| C22C 33/04 | (2006.01) | |
| C22B 1/245 | (2006.01) | |
| C22C 1/02 | (2006.01) | |
| C21B 13/00 | (2006.01) | |
| C22B 1/14 | (2006.01) | |
| C22B 1/244 | (2006.01) | |

(52) U.S. Cl.
CPC ............... *C21B 13/10* (2013.01); *C22B 1/14* (2013.01); *C22B 1/24* (2013.01); *C22B 1/244* (2013.01); *C22B 1/245* (2013.01); *C22B 1/2406* (2013.01); *C22B 5/10* (2013.01); *C22B 23/005* (2013.01); *C22B 23/02* (2013.01); *C22C 1/02* (2013.01); *C22C 33/04* (2013.01)

(58) Field of Classification Search
CPC ......... C22B 23/005; C22B 1/245; C22B 5/10; C22C 1/02; C22C 33/04
See application file for complete search history.

(56) References Cited

U.S. PATENT DOCUMENTS

| | | | |
|---|---|---|---|
| 6,126,718 | A | 10/2000 | Sawa et al. |
| 2002/0050187 | A1* | 5/2002 | Hino ................... C21B 13/0006 |
| | | | 75/503 |
| 2004/0154436 | A1* | 8/2004 | Ito et al. ............. C21B 13/0046 |
| | | | 75/476 |
| 2005/0211020 | A1 | 9/2005 | Sugitatsu et al. |
| 2009/0249921 | A1 | 10/2009 | Osborne et al. |
| 2013/0074654 | A1* | 3/2013 | Ito .......................... C22B 1/245 |
| | | | 75/363 |

FOREIGN PATENT DOCUMENTS

| | | |
|---|---|---|
| CN | 101020957 A | 8/2007 |
| EP | 1405924 A1 | 4/2004 |
| EP | 2325341 A1 | 5/2011 |
| JP | 01-021855 B2 | 4/1989 |
| JP | 06-025770 A | 2/1994 |
| JP | 2001-181720 A | 7/2001 |
| JP | 2003-239008 A | 8/2003 |
| JP | 2004-156140 A | 6/2004 |
| JP | 2010-229525 A | 10/2010 |
| JP | 2011-256414 A | 12/2011 |
| WO | 2014/080831 A1 | 5/2014 |

OTHER PUBLICATIONS

Office Action dated Mar. 12, 2018, issued to CN Patent Application No. 201580053382.7.
Extended European Search Report dated Apr. 23, 2018, issued to EP Patent Application No. 15849480.7.

* cited by examiner

FIG. 4
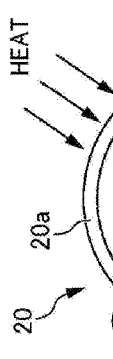
FIG. 4A
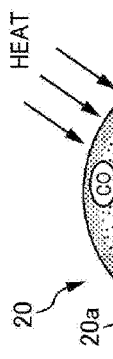
FIG. 4B
FIG. 4C
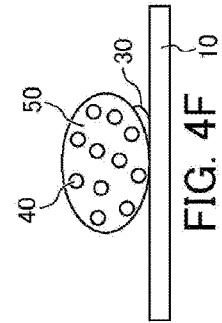
FIG. 4D
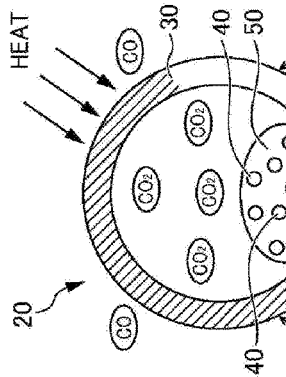
FIG. 4E
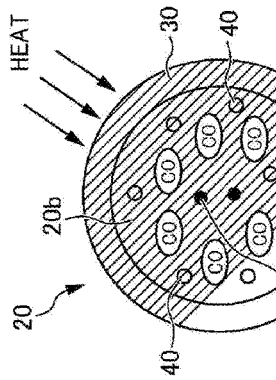
FIG. 4F

METHOD FOR SMELTING NICKEL OXIDE ORE

TECHNICAL FIELD

The present invention relates to a method for smelting nickel oxide ore. More specifically, the present invention relates to a method for smelting nickel oxide ore including: forming a pellet from nickel oxide ore serving as a raw material ore; and smelting it by heat-reducing the pellet in a smelting furnace, thereby smelting the nickel oxide ore.

BACKGROUND ART

As methods for smelting nickel oxide ore which may also be called limonite or saprolite, known are a dry smelting method for producing nickel matt using a flash smelting furnace, a dry smelting method for producing an iron-nickel alloy (ferronickel) using a rotary kiln or moving hearth furnace, a wet smelting method for producing mixed sulfide using an autoclave and the like.

Dry smelting of nickel oxide ore commonly includes roasting the ore in a rotary kiln, and then melting the roasted ore in an electric furnace to obtain a ferronickel metal, and then separating slag. At this time, some iron is allowed to remain in the slag for maintaining the concentration of nickel in the ferronickel metal at a high level. However, it disadvantageously requires a large amount of electric energy because the whole amount of nickel oxide ore needs to be melted to produce slag and a ferronickel.

Patent Document 1 discloses a method including inputting nickel oxide ore and a reducing agent (anthracite) into a rotary kiln, and reducing the ore in a semi-molten state to reduce parts of nickel and iron into metal, and then recovering a ferronickel by gravity separation or magnetic separation. Advantageously, according to the above method, a ferronickel metal can be obtained without performing electric melting, leading to reduced energy consumption. However, the method suffers from the following problems: reduction is performed in a semi-molten state, and thus the produced metal will be dispersed in the form of small particles; and the yield of nickel metal will be relatively low partly due to losses during gravity separation and magnetic separation.

Further, Patent Document 2 discloses a method for producing a ferronickel using a moving hearth furnace. The method described in the above document includes mixing raw materials containing nickel oxide and iron oxide with a carbonaceous reducing agent to form a pellet, and heat-reducing the mixture in a moving hearth furnace to obtain a reduced mixture, and then melting the reduced mixture in a separate furnace to obtain a ferronickel. The document describes that alternatively, both slag and a metal or one of either may be melted in a moving hearth furnace. However, melting the reduced mixture in a separate furnace requires a large amount of energy as in the melting process in an electric furnace. Further, disadvantageously, the slag and the metal may be fused to the furnace floor when melted in the furnace, resulting in difficult discharge from the furnace.

Patent Document 1: Japanese Examined Patent Application Publication No. H01-21855

Patent Document 2: Japanese Unexamined Patent Application, Publication No. 2004-156140

DISCLOSURE OF THE INVENTION

Problems to be Solved by the Invention

The present invention is proposed in view of the above actual circumstances. An object of the present invention is to provide a method for smelting nickel oxide ore, including forming a pellet from the nickel oxide ore, and heat-reducing the pellet in a smelting furnace to obtain an iron-nickel alloy (ferronickel), in which a high nickel grade of 4% or more can be achieved for the iron-nickel alloy by effectively promoting a smelting reaction in the smelting step (reduction step).

Means for Solving the Problems

The present inventors have conducted extensive studies to achieve the above object. After those extensive studies, the present inventors found that a reduction reaction can be effectively promoted to obtain an iron-nickel alloy with a high nickel grade by mixing nickel oxide ore serving as a raw material with a carbonaceous reducing agent to produce a pellet, and charging the pellet into a smelting furnace with the furnace floor covered with the carbonaceous reducing agent to perform reduction heat treatment. Then, the present invention was completed. That is, the present invention can provide the following.

(1) The present invention can provide a method for smelting nickel oxide ore, in which a pellet is formed from the nickel oxide ore, and the pellet is heat-reduced to obtain an iron-nickel alloy with a nickel grade of 4% or more, the method including: a pellet production step for producing a pellet from the nickel oxide ore; and a reduction step for heat-reducing the resulting pellet in a smelting furnace, the pellet production step including mixing raw materials containing at least the nickel oxide ore and a carbonaceous reducing agent to obtain a mixture, and agglomerating the mixture to form a pellet, and the reduction step including pre-covering the furnace floor of the smelting furnace with a furnace floor carbonaceous reducing agent before charging the resulting pellet into the smelting furnace, and performing reduction heat treatment with the pellet loaded onto the furnace floor carbonaceous reducing agent.

(2) Further, the present invention can provide the method for smelting nickel oxide ore according to the above (1), in which the reduction step includes heat-reducing the pellet loaded onto the furnace floor carbonaceous reducing agent at a heating temperature of 1350° C. or more and 1550° C. or less.

(3) Further, the present invention can provide the method for smelting nickel oxide ore according to the above (1) or (2), in which the temperature when the pellet is charged into the smelting furnace is 600° C. or less.

(4) Further, the present invention can provide the method according to any one of the above (1) to (3), in which in the pellet production step, the mixed amount of the carbonaceous reducing agent is adjusted so that the amount of carbon is 70% or more and 200% or less when the total combined value of a chemical equivalent required for reducing nickel oxide contained in the resulting pellet into nickel metal and a chemical equivalent required for reducing ferric oxide contained in said pellet into ferrous oxide is taken as 100%.

(5) Further, the present invention can provide the method for smelting nickel oxide ore according to any one of the above (1) to (4), in which in the reduction step, the time between the start of the reduction heat treatment and the removal of the pellet from the smelting furnace is less than 30 minutes.

Effects of the Invention

According to the present invention, an iron-nickel alloy with a high nickel grade of 4% or more can be obtained by effectively promoting a reduction reaction.

BRIEF DESCRIPTION OF THE DRAWINGS

FIG. 4 schematically shows a course of the reduction heat treatment for the pellet.

PREFERRED MODE FOR CARRYING OUT THE INVENTION

Below, specific embodiments of the present invention (hereafter referred to as the "present embodiments") will be described in detail with reference to the drawings. It is noted that the present invention shall not be limited to the following embodiments, and various modifications may be made without departing from the scope and the gist of the present invention.

<<Method for Smelting Nickel Oxide Ore>>

First, the method for smelting nickel oxide ore serving as a raw material ore will be described. Below, used as an example is a method for smelting, including pelletizing nickel oxide ore serving as a raw material ore, and reducing the resulting pellet to generate a metal (an iron-nickel alloy (hereinafter, the iron-nickel alloy may be referred to as a "ferronickel")) and slag, and then separating the metal from the slag to produce the ferronickel.

Figure 1:
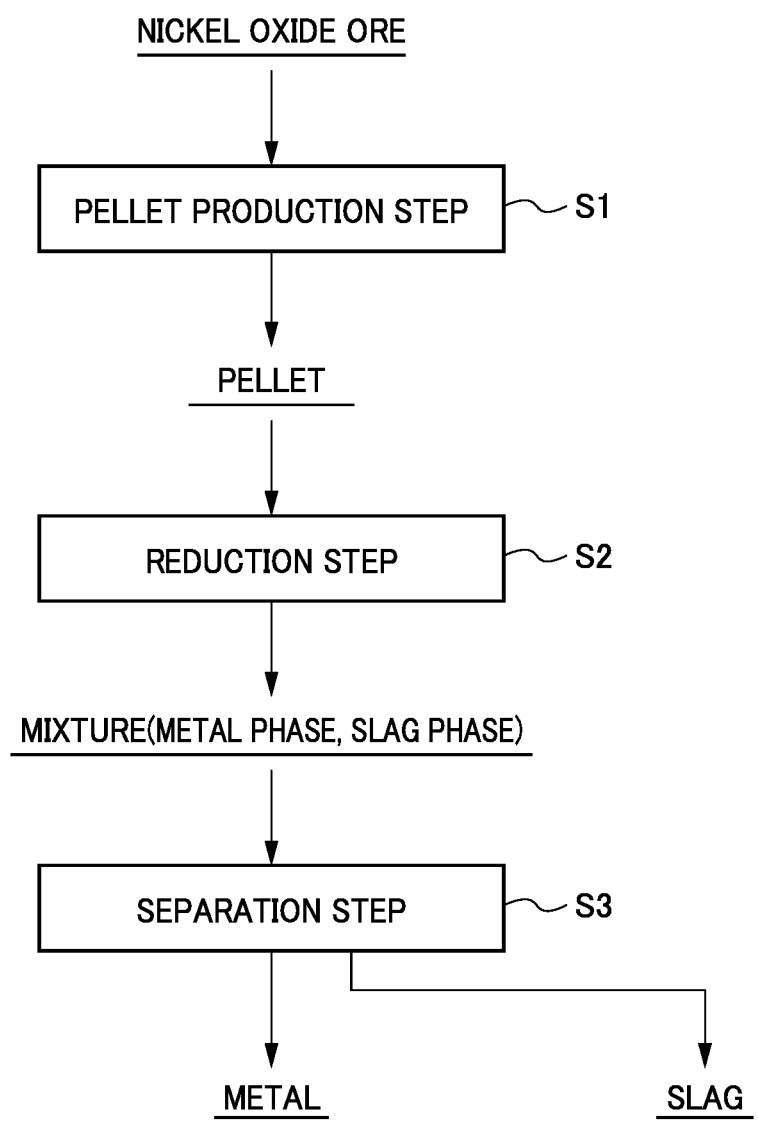
FIG. 1 is a process drawing showing the flow of a method for smelting nickel oxide ore.

The method for smelting nickel oxide ore according to the present embodiment includes preparing a pellet of the nickel oxide ore, and charging the pellet into a smelting furnace (reducing furnace), and performing heat reduction to obtain an iron-nickel alloy with a nickel grade of 4% or more. Specifically, as shown in the process chart of FIG. 1, the method for smelting nickel oxide ore according to the present embodiment includes a pellet production step S1 for producing a pellet from the nickel oxide ore, a reduction step S2 for heat-reducing the resulting pellet at a predetermined reduction temperature in a reducing furnace, and a separation step S3 of separating the metal and slag generated in the reduction step S2 to recover the metal.

<1. Pellet Production Step>

Figure 2:
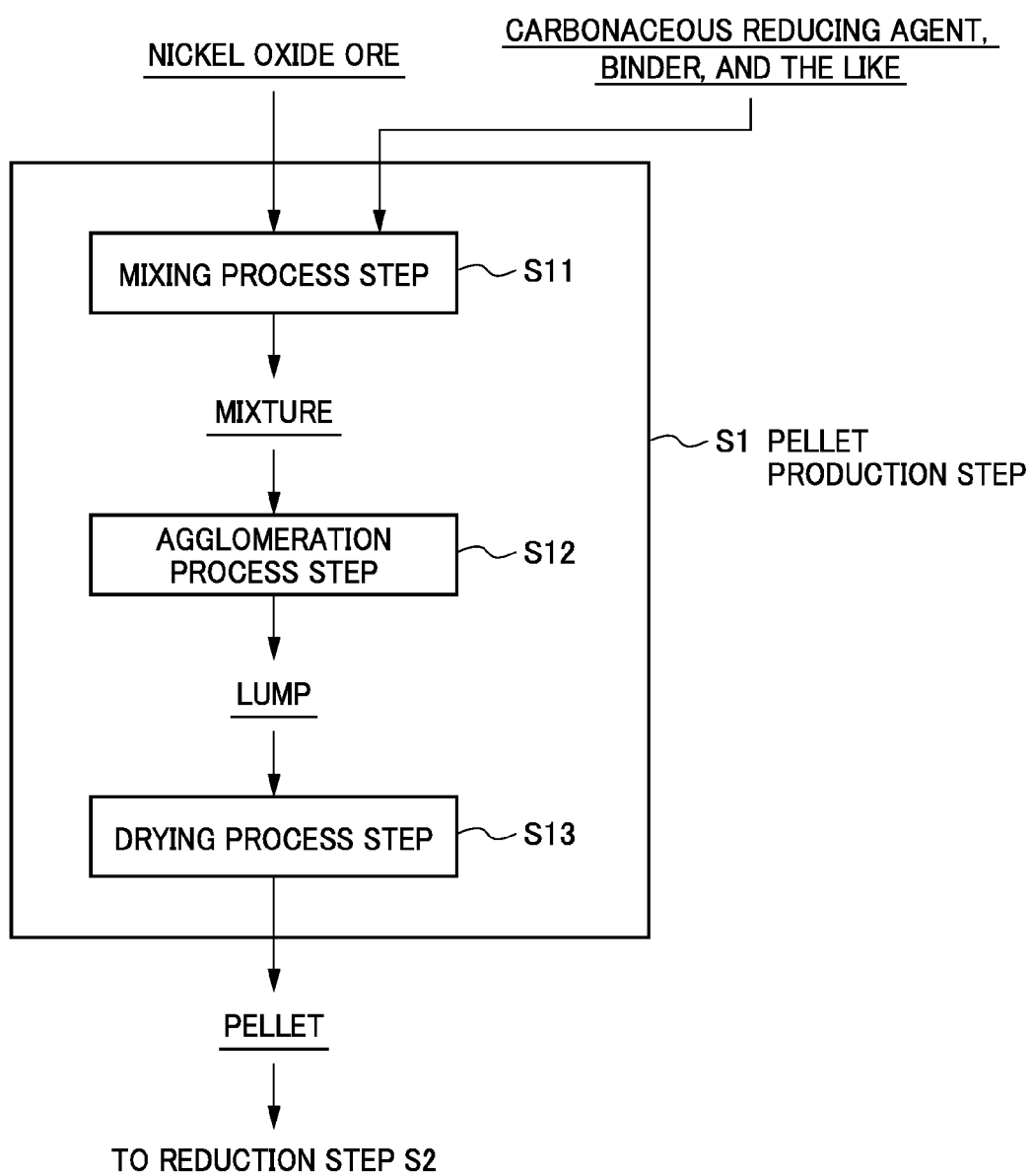
FIG. 2 is a process flowchart showing the flow of processes in the pellet production step of the method for smelting nickel oxide ore.

In the pellet production step S1, a pellet is produced from nickel oxide ore serving as a raw material ore. FIG. 2 is a process flowchart showing the flow of processing in the pellet production step S1. As shown in FIG. 2, the pellet production step S1 includes a mixing process step S11 of mixing raw materials containing a nickel oxide ore, an agglomeration process step S12 of forming (granulating) the resulting mixture into a lump, and a drying process step S13 of drying the resulting lump.

(1) Mixing Process Step

In the mixing process step S11, a raw material powder containing nickel oxide ore is mixed to obtain a mixture. Specifically, in the mixing process step S11, raw material powders of a flux component, a binder and the like are mixed in addition to a nickel oxide ore serving as a raw material ore to obtain a mixture, the raw material powders having a particle size, for example, on the order of 0.2 mm to 0.8 mm.

Here, when producing a pellet according to the present embodiment, a predetermined amount of a carbonaceous reducing agent is mixed to obtain a mixture, which is then used to form the pellet. There is no particular limitation for the carbonaceous reducing agent, but examples include coal powder, coke powder and the like. It is noted that the carbonaceous reducing agent preferably has a particle size similar to that of the nickel oxide ore as described above.

Further, there is no particular limitation for the mixed amount of a carbonaceous reducing agent, but it can be adjusted so that the amount of carbon is 70% or more and 200% or less when the total combined value of both chemical equivalents required for reducing the whole amount of nickel oxide contained in the resulting pellet into nickel metal and for reducing ferric oxide contained in said pellet into ferrous oxide (which may be referred to as the "total value of chemical equivalents" for convenience) is taken as 100%.

When a pellet is produced using a mixed amount of a carbonaceous reducing agent in a predetermined proportion, i.e., using a mixed amount of a carbonaceous reducing agent adjusted so that the amount of carbon is 70% or more and 200% or less relative to the aforementioned total value of chemical equivalents being 100%, trivalent iron oxide can effectively be reduced into divalent iron oxide, and nickel oxide can also be converted into a metal, and divalent iron oxide can be further reduced into a metal to form a metal shell in the reduction heat treatment in the next reduction step S2 as further described below. In addition, partial reduction treatment can be performed in which some of the iron oxide contained in the shell is allowed to remain as oxide. This more effectively enables separate formation of a ferronickel metal (metal) with a high nickel grade and ferronickel slag (slag) inside one pellet.

There is no particular limitation for the nickel oxide ore, but limonite ore, saprolite ore and the like can be used. A small amount of iron ore (iron oxide) is contained in the nickel oxide ore.

Further, examples of the binder can include bentonite, polysaccharide, resin, water glass, dewatered cake and the like. Further, examples of the flux component can include calcium oxide, calcium hydroxide, calcium carbonate, silicon dioxide and the like.

(2) Agglomeration Process Step

In the agglomeration process step S12, the mixture of raw material powders obtained in the mixing process step S11 is formed (granulated) into a lump. Specifically, an amount of water required for agglomeration is added to the mixture obtained in the mixing process step S11, and a pellet-like lump is formed with a lump production device (such as a rolling granulator, a compression molding machine, and an extrusion machine) or by hand.

There is no particular limitation for the shape of the pellet, but it may be, for example, spherical. Further, there is no particular limitation for the size of the lump to be formed into a pellet-like shape, but it may be, for example, on the order of 10 mm to 30 mm in terms of the size of a pellet (or the diameter in the case of a spherical pellet) to be charged into a smelting furnace in the reduction step after subjected to the drying process and the preheat treatment described below.

(3) Drying Process Step

In the drying process step S13, the lump obtained from the agglomeration process step S12 is subjected to a drying process. The lump formed into a pellet-like lump in the agglomeration process has an excess content of water as high as, for example, about 50 wt %, resulting in a sticky condition. In the drying process step S13, a drying process is performed so that the solid content of the lump is, for example, about 70 wt %, and the water content is about 30 wt % in order to facilitate the handling of the pellet-like lump.

There is no particular limitation for the drying process of a lump in the drying process step S13, but more specifically, hot air, at 300° C. to 400° C. for example, may be blown against the lump for drying. It is noted that the temperature of a lump when performing the drying process is less than 100° C.

An example of the composition (wt %) of the solid content of a pellet-like lump after the drying process is shown in Table 1 below. It is noted that the composition of a lump after the drying process shall not be limited to this.

TABLE 1

| | NiO | $Fe_2O_3$ | $SiO_2$ | CaO | MgO | $Al_2O_3$ | Binder | Others |
|---|---|---|---|---|---|---|---|---|
| Composition of solid content of dried pellet [wt %] | 0.8~1.5 | 30~70 | 10~25 | 0.1~10 | 4~12 | 4~9 | About 1 | Remainder |

In the pellet production step S1, a raw material powder containing nickel oxide ore serving as a raw material ore is mixed as described above, and the resulting mixture is granulated (agglomerated) into a pellet-like shape and dried to produce a pellet. At this time, a carbonaceous reducing agent is mixed according to the composition as described above when mixing raw material powders, and the resulting mixture is used to produce a pellet. The size of the resulting pellet is on the order of 10 mm to 30 mm. Pellets are to be produced which are strong enough to maintain the shapes thereof, such that, for example, the proportion of collapsed pellets is about 1% or less even after they are dropped from a height of 1 m. Such pellets can withstand impacts of dropping and the like upon charging in the subsequent step of the reduction step S2, and can maintain their pellet-like shapes. Further, appropriate spaces will be formed between pellets. These can allow a smelting reaction in the smelting step to progress appropriately.

It is noted that a preheat treatment step may be included in this pellet production step S1, the preheat treatment step including preheating lumped pellets subjected to the drying process in the drying process step S13 described above to a predetermined temperature. Production of pellets via preheating a lump after the drying process as described above can reduce cracks in pellets induced by heat shock (breaking, crumbling) more effectively even when pellets are heat-reduced at a temperature as high as, for example, about 1400° C. in the reduction step S2. For example, the proportion of crumbled pellets relative to the total pellets charged into a smelting furnace can be reduced to a low level, and the pellet-like shape can be maintained more effectively.

Specifically, in the preheat treatment, pellets after the drying process are preheated at a temperature of 350° C. to 600° C. Further, the preheat treatment is preferably performed at a temperature of 400° C. to 550° C. Preheat treatment performed at a temperature of 350° C. to 600° C., or preferably at a temperature of 400° C. to 550° C. as described above, can reduce crystal water contained in nickel oxide ore of pellets. Therefore, collapsing of pellets due to the release of their crystal water can be reduced even when the temperature is rapidly increased due to them being charged into a smelting furnace at about 1400° C. Further, the preheat treatment performed as described above allows the thermal expansion of particles of nickel oxide ore, a carbonaceous reducing agent, a binder, a flux component and the like that compose the pellets to proceed slowly in two steps. This, in turn, can reduce collapsing of pellets due to differential expansion of particles. It is noted that there is no particular limitation for the processing time for the preheat treatment, and it can be appropriately adjusted depending on the size of the lump containing nickel oxide ore. It may be, however, on the order of 10 minutes to 60 minutes when a lump with a common size which results in obtained pellets having a size on the order of 10 mm to 30 mm is used.

<2. Reduction Step>

In the reduction step S2, the pellet obtained from the pellet production step S1 is heat-reduced at a predetermined reduction temperature. This reduction heat treatment of the pellet in the reduction step S2 promotes a smelting reaction (reduction reaction) to generate a metal and slag.

Specifically, the reduction heat treatment in the reduction step S2 is performed in a smelting furnace (reducing furnace) and the like. A pellet containing nickel oxide ore is charged into the smelting furnace heated to a predetermined temperature for performing heat reduction. Specifically, the reduction heat treatment of a pellet is preferably performed at 1350° C. or more and 1550° C. or less. A heat reduction temperature of less than 1350° C. may not be able to effectively promote a reduction reaction. On the other hand, a heat reduction temperature of more than 1550° C. may excessively promote a reduction reaction, resulting in a decreased nickel grade.

There is no particular limitation for the temperature when a pellet is charged into a smelting furnace, but it is preferably 600° C. or less. Further, it is more preferably 550° C. or less in view that the possibility of burning a pellet due to a carbonaceous reducing agent can be more efficiently reduced.

When the temperature when a pellet is charged into a smelting furnace is more than 600° C., combustion of a carbonaceous reducing agent contained in a pellet may occur. On the other hand, there is no particular limitation for the lower limit, but it is preferably 500° C. or more because a much lower temperature may be disadvantageous in view of heating costs for a process where reduction heat treatment is continuously performed. It is noted that even if the temperature of a pellet upon charging is not controlled within the above temperature range, a pellet can be charged into a smelting furnace without causing any particular problems if charging is completed in a short time during which no impacts from burning and sintering occur.

Figure 3:
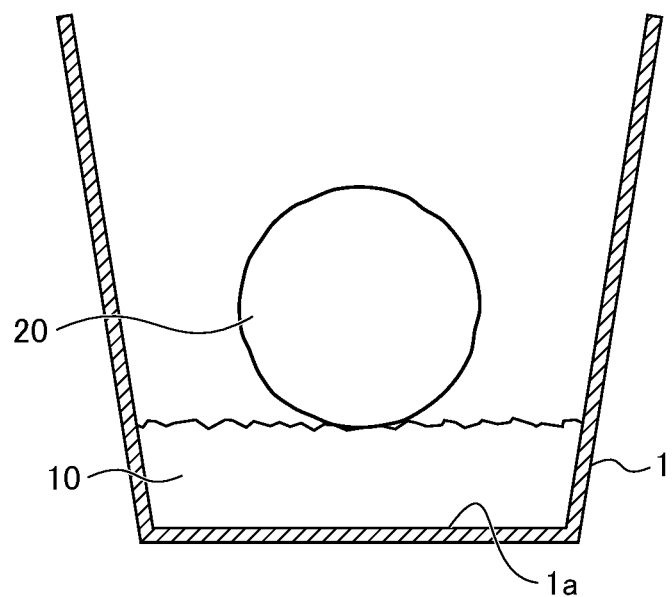
FIG. 3 schematically shows a state where a pellet is charged into a smelting furnace.

Now, in the present embodiment, for charging the resulting pellet in a smelting furnace, the furnace floor of said smelting furnace is pre-covered with a carbonaceous reducing agent (hereinafter referred to as the "furnace floor carbonaceous reducing agent"), and pellets are loaded onto said furnace floor carbonaceous reducing agent pre-covering the floor to perform reduction heat treatment. Specifically, as shown in the schematic view of FIG. 3, the furnace floor 1a of a smelting furnace 1 is pre-covered with a furnace floor carbonaceous reducing agent 10, for example, coal powder and the like, onto which a produced pellet 20 is loaded.

There is no particular limitation for the amount of the furnace floor carbonaceous reducing agent used for covering the furnace floor of a smelting furnace as long as it can create a reducing atmosphere in which a metal shell formed during the reduction heat treatment as described below can be melted.

Here, FIG. 4A to 4F is a schematic view illustrating the course of the reduction reaction in a pellet when the reduction heat treatment is performed in the reduction step S2. First, in the present embodiment as described above, the furnace floor of a smelting furnace is pre-covered with a furnace floor carbonaceous reducing agent 10, and a pellet 20 is loaded onto that furnace floor carbonaceous reducing agent 10, and then the reduction heat treatment is started. It is noted that the reference number "15" is assigned to the carbonaceous reducing agent contained in the pellet 20.

In the reduction heat treatment, heat is conducted through the surface (surface layer portion) of the pellet 20 to promote a reduction reaction of iron oxide contained in a raw material ore as shown in the following reaction formula (i) (FIG. 4A), for example.

$$3Fe_2O_3+C \rightarrow 2Fe_3O_4+CO \quad (i)$$

When reduction at the surface layer portion 20a of the pellet 20 progresses to a reduction level of FeO ($Fe_3O_4$+C→3FeO+CO), replacement of nickel oxide (NiO) present as $NiO-SiO_2$ with FeO is promoted to initiate reduction of Ni at the surface layer portion 20a as represented by the following reaction formula (ii) (FIG. 4B), for example. Subsequently, a reaction similar to the above reduction reaction of Ni is gradually promoted in the inside as heat is conducted from the outside.

$$NiO+CO \rightarrow Ni+CO_2 \quad (ii)$$

When the reduction reaction of iron oxide, for example, as shown in the following reaction formula (iii) progresses along with the reduction reaction of nickel oxide at the surface layer portion 20a of the pellet 20, a metal-forming process progresses at said surface layer portion 20a in a very short time such as about 1 minute to form an iron-nickel alloy (ferronickel), and then a shell of metal (metal shell) 30 is formed (FIG. 4C). It is noted that the shell 30 formed at this stage is thin, allowing $CO/CO_2$ gas to easily pass through it. Therefore, the reaction gradually proceeds toward the inside as heat is conducted from the outside.

$$FeO+CO \rightarrow Fe+CO_2 \quad (iii)$$

Then, as the metal shell 30 at the surface layer portion 20a of the pellet 20 gradually becomes thick due to the inwardly proceeding reaction, the inside 20b of the pellet 20 is gradually filled with CO gas. Then, the reducing atmosphere in the inside 20b increases to promote the metal-forming process of Ni and Fe, resulting in the formation of a metal particle 40 (FIG. 4D). Meanwhile, a slag component contained in the pellet 20 is gradually melted to generate slag 50 in the liquid phase (in a semi-molten state) in the inside (20b) of the metal shell 30.

When all of the carbonaceous reducing agent 15 contained in the pellet 20 is consumed, the metal-forming process of Fe stops, and non-metallized Fe remains in the form of FeO (some are present as $Fe_3O_4$), and the slag 50 in a semi-molten state in the inside (20b) of the metal shell 30 will be totally melted (FIG. 4E). The slag 50 totally melted is in a state such that the metal particles 40 are dispersed therein. Meanwhile, at this stage, the excess portion of the carbon component in the furnace floor carbonaceous reducing agent 10 such as coal powder arranged to cover the furnace floor of a smelting furnace, the excess portion not having been involved in the above reduction reaction, is incorporated into the metal shell 30 of an iron-nickel alloy (also referred to as "carburization" (shown by dotted-line arrows in FIG. 4E)), reducing the melting point of the iron-nickel alloy. As a result, the metal shell 30 of the iron-nickel alloy will be gradually melted.

As carburization of the metal shell 30 progresses, the shell 30 will be totally melted (FIG. 4F). The metal particles 40 are recovered in a state where they are dispersed in the slag 50, and then the slag can be separated by magnetic separation treatment and the like after milling treatment and the like to obtain the iron-nickel alloy.

It is noted that when the reduction heat treatment is performed without covering the furnace floor of a smelting furnace with the furnace floor carbonaceous reducing agent 10, incorporation (carburization) of the carbon component into the metal shell as described above does not occur, and thus the metal shell will not be melted. In that case, the spherical state remains intact when the treatment ends, and thus, crushing and the like of the formed metal shell first needs to be performed in the subsequent separation step S3. However, there are limitations for crushing and the like, and the metal shell may not be crushed efficiently. In that case, the metal may not be effectively isolated even when magnetic separation treatment and the like is performed, resulting in a significantly decreased recovery rate of nickel.

Here, when the shell 30 is maintained in the liquid phase for a long time, reduction of iron oxide may be promoted which remains unreduced by the furnace floor carbonaceous reducing agent 10 arranged to cover the furnace floor of a smelting furnace, resulting in a decreased nickel grade. Therefore, it is preferable for the metal and the slag to be removed from the furnace promptly. Further, the reduction reaction is preferably controlled by cooling.

Specifically, the time between the charging of a pellet into a smelting furnace to start the reduction heat treatment and the removal of the pellet from the smelting furnace is preferably less than 30 minutes. Further, the pellet is preferably cooled so that the temperature becomes 500° C. or below within 8 minutes after removing the pellet from the furnace. When the time between the start of the reduction heat treatment and the removal from the smelting furnace is less than 30 minutes, and the pellet is cooled so that the temperature becomes 500° C. or below within 8 minutes after removal, the reduction reaction of the pellet can be controlled efficiently, and reduction of iron oxide present within the shell can be stopped to prevent deterioration of the nickel grade.

In the present embodiment as described above, trivalent iron oxide can be reduced into divalent iron oxide by a carbonaceous reducing agent mixed in a pellet, and nickel oxide can also be converted into a metal, and divalent iron oxide can be further reduced into a metal to form a metal shell and metal particles. In addition, the reduction heat treatment is performed with the furnace floor of a smelting furnace covered with a furnace floor carbonaceous reducing agent, and thus the carbon component in the excess portion of the furnace floor carbonaceous reducing agent not involved in the aforementioned reduction reaction, which was part of the furnace floor carbonaceous reducing agent arranged to cover the floor, is incorporated into an iron-nickel alloy in the metal shell as the reduction treatment progresses, reducing the melting point to allow the iron-nickel alloy to be melted and dispersed into the slag. These features enable the production of an iron-nickel alloy (ferronickel) with a high nickel grade of 4% or more.

Further, in particular, the amount of a carbonaceous reducing agent to be mixed in a pellet is adjusted to a predetermined proportion, i.e., adjusted so that the amount of carbon is 70% or more and 200% or less relative to the total value of chemical equivalents as described above being 100%, which is then mixed with other raw materials to produce a pellet. Thereby, some of the iron oxide to be present in the resulting metal shell will not be reduced in the reduction reaction; i.e., iron oxide will be partially reduced such that, for example, 30% or more of the iron will remain as iron oxide. This enables enrichment of nickel, and also enables separate production of a ferronickel metal with an even higher nickel grade as well as ferronickel slag inside one pellet.

It is noted that the metal and the slag separately produced will not be mixed together even though the slag in a pellet is melted and present in the liquid phase, but will form a mixture where the metal solid phase and the slag solid phase coexist as separate phases after subsequent cooling. The volume of this mixture is reduced to a volume on the order of 50% to 60% as compared with that of the charged pellet.

<3. Separation Step>

In the separation step S3, the metal and the slag produced in the reduction step S2 are separated to recover the metal. Specifically, the metal phase is separated and recovered from a mixture containing the metal phase (the metal solid phase) and the slag phase (the slag solid phase containing a carbonaceous reducing agent) obtained from the reduction heat treatment of a pellet.

As a method for separating the metal phase and the slag phase from the mixture of the metal phase and the slag phase obtained as a solid, for example, the gravity separation method, the magnetic separation method and the like can used in addition to a method for removing large-sized particulate metal by sieving after cracking or grinding. Further, the resulting metal and slag phases have poor wettability, allowing them to be separated easily.

The metal and slag phases are separated as described above to recover the metal phase.

EXAMPLES

Below, the present invention will be described in a more specific way with reference to Examples and Comparative Examples, but the present invention shall not be limited to the following Examples in any sense.

Example 1

Nickel oxide ore serving as a raw material ore, limestone serving as a flux component, a binder, and a carbonaceous reducing agent were mixed to obtain a mixture. The mixed amount of the carbonaceous reducing agent included in the mixture was such that the amount of carbon is 100% relative to the total combined value of a chemical equivalent required for reducing nickel oxide contained in the resulting pellet into nickel metal and a chemical equivalent required for reducing ferric oxide contained in said pellet into ferrous oxide (hereinafter referred to as the "total value of chemical equivalents" for convenience) was taken as 100%.

Next, an appropriate amount of water was added to the resulting mixture of the raw material powders, and kneading was performed by hand to form a spherical lump. Then, drying treatment was performed in which hot air at 300° C. to 400° C. was blown against the lump until the solid content of the resulting lump became about 70 wt %, and the water content became about 30 wt % to produce a spherical pellet (size (diameter): 17 mm). The composition of the solid content of the pellet after the drying treatment is shown in Table 2 below.

TABLE 2

| | NiO | $Fe_2O_3$ | $SiO_2$ | CaO | MgO | $Al_2O_3$ |
|---|---|---|---|---|---|---|
| Composition of solid content of dried pellet [wt %] | 1.0 | 40 | 17 | 6.2 | 4.2 | 6.6 |

Next, the furnace floor of a smelting furnace was covered with a coal powder (carbon content: 85 wt %, particle size: 0.4 mm) which served as a carbonaceous reducing agent, and 100 produced pellets were then charged so as to be loaded onto the furnace floor carbonaceous reducing agent arranged to cover the furnace floor thereof. The pellets were charged into the smelting furnace at a temperature condition of 600° C. or less.

Then, reduction heat treatment was performed in the smelting furnace at a reduction temperature of 1400° C.

The pellets were removed from the furnace 10 minutes after the start of the reduction heat treatment. It was confirmed that cooling to 500° C. or below was completed within 1 minute after removal from the furnace.

An iron-nickel alloy (ferronickel metal) and slag were obtained from the reduction heat treatment as described above. The nickel and iron grades of the resulting ferronickel metal are shown in Table 3 below. The recovery rate of nickel was 95% or more as calculated from the mass balance.

TABLE 3

| | Grade [%] | |
|---|---|---|
| | Fe | Ni |
| Metal | 78 | 18 |
| Slag | 37 | <0.1 |

Example 2

Raw materials were mixed as in Example 1 to obtain a mixture, and then dry pellets were produced. At this time, the mixed amount of the carbonaceous reducing agent as a raw material in Example 2 was such that the amount of carbon was 200% relative to the total value of the aforementioned chemical equivalents being 100%.

Next, the furnace floor of a smelting furnace was covered with a coal powder (carbon content: 85 wt %, particle size: 0.4 mm) which served as a carbonaceous reducing agent, and 100 produced pellets were then charged so as to be loaded onto the furnace floor carbonaceous reducing agent arranged to cover the furnace floor thereof. The pellets were charged into the smelting furnace at a temperature condition of 600° C. or less.

Then, reduction heat treatment was performed in the smelting furnace at a reduction temperature of 1400° C.

The pellets were removed from the furnace 5 minutes after the start of the reduction heat treatment. It was confirmed that cooling to 500° C. or below was completed within 1 minute after removal from the furnace.

A ferronickel metal and slag were obtained from the reduction heat treatment as described above. The nickel and iron grades of the resulting ferronickel metal are shown in Table 4 below. The recovery rate of nickel was 95% or more as calculated from the mass balance.

TABLE 4

|  | Grade [%] | |
| --- | --- | --- |
|  | Fe | Ni |
| Metal | 88 | 9 |
| Slag | 33 | <0.1 |

Example 3

Raw materials were mixed as in Example 1 to obtain a mixture, and then dry pellets were produced. At this time, the mixed amount of the carbonaceous reducing agent as a raw material in Example 3 was such that the amount of carbon was 70% relative to the total value of the aforementioned chemical equivalents being 100%.

Next, the furnace floor of a smelting furnace was covered with a coal powder (carbon content: 85 wt %, particle size: 0.4 mm) which served as a carbonaceous reducing agent, and 100 produced pellets were then charged so as to be loaded onto the furnace floor carbonaceous reducing agent arranged to cover the furnace floor thereof. The pellets were charged into the smelting furnace at a temperature condition of 600° C. or less.

Then, reduction heat treatment was performed in the smelting furnace at a reduction temperature of 1400° C.

The pellets were removed from the furnace 10 minutes after the start of the reduction heat treatment. It was confirmed that cooling to 500° C. or below was completed within 1 minute after removal from the furnace.

A ferronickel metal and slag were obtained from the reduction heat treatment as described above. The nickel and iron grades of the resulting ferronickel metal are shown in Table 5 below. The recovery rate of nickel was 95% or more as calculated from the mass balance.

TABLE 5

|  | Grade [%] | |
| --- | --- | --- |
|  | Fe | Ni |
| Metal | 76 | 21 |
| Slag | 39 | <0.1 |

Example 4

A mixture was obtained as in Example 3, and then pellets were produced. The pellets were subjected to reduction heat treatment under similar conditions.

After confirming that the reduction reaction was completed 10 minutes after the start of the reduction heat treatment, the pellets were then removed from the furnace 15 minutes after the start of said reduction heat treatment. It was confirmed that cooling to 500° C. or below was completed within 1 minute after removal from the furnace.

A ferronickel metal and slag were obtained from the reduction heat treatment as described above. The nickel and iron grades of the resulting ferronickel metal are shown in Table 6 below. The recovery rate of nickel was 95% or more as calculated from the mass balance.

TABLE 6

|  | Grade [%] | |
| --- | --- | --- |
|  | Fe | Ni |
| Metal | 83 | 15 |
| Slag | 35 | <0.1 |

Comparative Example 1

Heat reduction treatment was performed as in Example 1 except that pellets alone were charged into a smelting furnace without covering the furnace floor with a coal powder serving as a carbonaceous reducing agent.

The results showed that metal shells formed during the reduction reaction were not melted, and remained as they were (remained in a spherical state). It is noted that a small slag lump and ferronickel particles dispersed in the small slag lump coexisted inside the cavity formed in the metal shell (see FIG. 4E). Because metal shells were not melted in Comparative Example 1, separation of the ferronickel metal from the slag was difficult, resulting in a very low recovery rate of nickel as low as about 70%.

Comparative Example 2

Raw materials were mixed as in Example 1 to obtain a mixture, and then dry pellets were produced. At this time, the mixed amount of the carbonaceous reducing agent as a raw material in Comparative Example 2 was such that the amount of carbon was 250% relative to the total value of the aforementioned chemical equivalents being 100%.

Next, the furnace floor of a smelting furnace was covered with a coal powder (carbon content: 85 wt %, particle size: 0.4 mm) which served as a carbonaceous reducing agent, and 100 produced pellets were then charged so as to be loaded onto the furnace floor carbonaceous reducing agent arranged to cover the furnace floor thereof. The pellets were charged into the smelting furnace at a temperature condition of 600° C. or less.

Then, reduction heat treatment was performed in the smelting furnace at a reduction temperature of 1400° C.

The pellets were removed from the furnace 3 minutes after the start of the reduction heat treatment. It was confirmed that cooling to 500° C. or below was completed within 1 minute after removal from the furnace.

A ferronickel metal and slag were obtained from the reduction heat treatment as described above. The nickel and iron grades of the resulting ferronickel metal are shown in Table 7 below. As clearly seen from the result of the nickel grade (3%) shown in Table 7, nickel was not sufficiently enriched in the ferronickel metal, and a metal with a high nickel grade was not able to be obtained.

TABLE 7

| | Grade [%] | |
|---|---|---|
| | Fe | Ni |
| Metal | 93 | 3 |

Comparative Example 3

Raw materials were mixed as in Example 1 to obtain a mixture, and then dry pellets were produced, and 100 of those pellets were then charged so as to be loaded onto the furnace floor carbonaceous reducing agent arranged to cover the furnace floor. The pellets were charged into the smelting furnace at a temperature condition of 600° C. or less.

In Comparative Example 3, the reduction heat treatment was performed in the smelting furnace at a reduction temperature of 1300° C.

The pellets were removed from the furnace 10 minutes after the start of the reduction heat treatment. It was confirmed that cooling to 500° C. or below was completed within 1 minute after removal from the furnace.

The results showed that metal shells formed during the reduction reaction were not melted, and remained as they were (remained in a spherical state). It is noted that a small slag lump and ferronickel particles dispersed in the small slag lump coexisted inside the cavity formed in the metal shell (see FIG. 4E). Because metal shells were not melted, and metal therein was not dispersed in the slag in Comparative Example 3, separation of the ferronickel metal from the slag was difficult, resulting in a very low recovery rate of nickel as low as about 70%.

Comparative Example 4

Raw materials were mixed as in Example 1 to obtain a mixture, and then dry pellets were produced, and 100 of those pellets were then charged so as to be loaded onto the furnace floor carbonaceous reducing agent arranged to cover the furnace floor. The pellets were charged into the smelting furnace at a temperature condition of 600° C. or less.

In Comparative Example 4, the reduction heat treatment was performed in the smelting furnace at a reduction temperature of 1570° C.

The pellets were removed from the furnace 3 minutes after the start of the reduction heat treatment. It was confirmed that cooling to 500° C. or below was completed within 1 minute after removal from the furnace.

A ferronickel metal and slag were obtained from the reduction heat treatment as described above. The nickel and iron grades of the resulting ferronickel metal are shown in Table 8 below. As clearly seen from the result of the nickel grade (3%) shown in Table 8, nickel was not sufficiently enriched in the ferronickel metal, and a metal with a high nickel grade was not able to be obtained.

TABLE 8

| | Grade [%] | |
|---|---|---|
| | Fe | Ni |
| Metal | 93 | 3 |

Comparative Example 5

A mixture was obtained as in Example 3, and then pellets were produced. The pellets were subjected to the reduction heat treatment under similar conditions.

After confirming that the reduction reaction was completed 10 minutes after the start of the reduction heat treatment, the pellets were then removed from the furnace 35 minutes after the start of that reduction heat treatment. It was confirmed that cooling to 500° C. or below was completed within 1 minute after removal from the furnace.

A ferronickel metal and slag were obtained from the reduction heat treatment as described above. The nickel and iron grades of the resulting ferronickel metal are shown in Table 9 below. As clearly seen from the result of the nickel grade (3%) shown in Table 9, nickel was not sufficiently enriched in the ferronickel metal, and a metal with a high nickel grade was not able to be obtained.

TABLE 9

| | Grade [%] | |
|---|---|---|
| | Fe | Ni |
| Metal | 92 | 3 |

Comparative Example 6

Raw materials were mixed as in Example 1 to obtain a mixture, and then dry pellets were produced. At this time, the mixed amount of the carbonaceous reducing agent as a raw material in Comparative Example 6 was such that the amount of carbon was 60% relative to the total value of the aforementioned chemical equivalents being 100%.

Next, the furnace floor of a smelting furnace was covered with a coal powder (carbon content: 85 wt %, particle size: 0.4 mm) which served as a carbonaceous reducing agent, and 100 produced pellets were then charged so as to be loaded onto the furnace floor carbonaceous reducing agent arranged to cover the furnace floor thereof. The pellets were charged into the smelting furnace at a temperature condition of 600° C. or less.

Then, reduction heat treatment was performed in the smelting furnace at a reduction temperature of 1400° C.

The pellets were removed from the furnace 3 minutes after the start of the reduction heat treatment. However, metal shells were not formed, and the pellets were in a semi-molten state. Therefore, the metal was not able to be sufficiently separated from the slag.

EXPLANATION OF REFERENCE NUMERALS

10 Furnace floor carbonaceous reducing agent (arranged to cover furnace floor)
15 Carbonaceous reducing agent
20 Pellet
30 Metal shell (Shell)
40 Metal particle
50 Slag

The invention claimed is:

1. A method for smelting nickel oxide ore, in which a pellet is formed from the nickel oxide ore, and the pellet is heat-reduced to obtain an iron-nickel alloy with a nickel grade of 4% by mass or more, the method comprising:
    a pellet production step for producing a pellet from the nickel oxide ore, and a reduction step for applying reduction heat treatment to the resulting pellet in a smelting furnace, the pellet production step comprising mixing raw materials containing at least the nickel oxide ore and a carbonaceous reducing agent to obtain a mixture, and agglomerating the mixture to form a pellet, wherein a mixed amount of the carbonaceous reducing agent is adjusted so that the amount of carbon is 70% or more and 200% or less when the total combined value of a chemical equivalent required for reducing nickel oxide contained in the resulting pellet into nickel metal and a chemical equivalent required for reducing ferric oxide contained in pellet into ferrous oxide is taken as 100%, and the reduction step comprising pre-covering the furnace floor of the smelting furnace with a furnace floor carbonaceous reducing agent in an amount that can create a reducing atmosphere in which a metal shell formed at the surface layer portion of the pellet during the reduction heat treatment can be melted before charging the resulting pellet into the smelting furnace, and performing the reduction heat treatment with the pellet loaded onto the furnace floor carbonaceous reducing agent so that a metal particle is formed and a slag is generated in the metal shell formed, and the metal shell is melted.

2. The method for smelting nickel oxide ore according to claim 1, wherein the reduction step comprises heat-reducing the pellet loaded onto the furnace floor carbonaceous reducing agent at a heating temperature of 1350° C. or more and 1550° C. or less.

3. The method for smelting nickel oxide ore according to claim 1, wherein the temperature of the smelting furnace when the pellet is charged into the smelting furnace is 600° C. or less.

4. The method for smelting nickel oxide ore according to claim 1, wherein, in the reduction step, the time between the start of the reduction heat treatment and removal of the pellet from the smelting furnace is less than 30 minutes.

5. The method for smelting nickel oxide ore according to claim 1, wherein partial reduction treatment is performed in which some of iron oxide contained in the metal shell formed in reduction reaction is not reduced, such that 30% by mass or more of the iron remains as iron oxide.

* * * * *